US006726114B2

(12) United States Patent
Blaschke et al.

(10) Patent No.: US 6,726,114 B2
(45) Date of Patent: Apr. 27, 2004

(54) EVAPORATIVE BURNER

(75) Inventors: Walter Blaschke, Deizisau (DE); Günter Eberspach, Wolfschlugen (DE); Bruno Lindl, Pfinztal (DE)

(73) Assignee: J. Eberspacher GmbH & Co., KG, Esslingen (DE)

( * ) Notice: Subject to any disclaimer, the term of this patent is extended or adjusted under 35 U.S.C. 154(b) by 0 days.

(21) Appl. No.: 10/176,553

(22) Filed: Jun. 21, 2002

(65) Prior Publication Data

US 2003/0027090 A1 Feb. 6, 2003

(30) Foreign Application Priority Data

Jun. 26, 2001 (DE) ........................................ 101 30 638
Jul. 25, 2001 (DE) ........................................ 101 36 292

(51) Int. Cl.[7] ................................................ G05D 23/00
(52) U.S. Cl. ........................ 237/2 R; 126/390; 431/168
(58) Field of Search ....................... 237/12.3 C, 12.3 R, 237/2 R; 165/41, 42; 126/390, 344; 431/168

(56) References Cited

U.S. PATENT DOCUMENTS

| | | | | |
|---|---|---|---|---|
| 4,365,952 A | | 12/1982 | Ohmukai et al. | |
| 4,411,385 A | * | 10/1983 | Lamkewitz | 237/2 A |
| 4,472,133 A | | 9/1984 | Petersen et al. | |
| 4,530,658 A | * | 7/1985 | Panick | 431/329 |
| 4,538,985 A | | 9/1985 | Zwicker | |
| 4,703,888 A | | 11/1987 | Kawamura et al. | |
| 4,744,747 A | | 5/1988 | Kawamura et al. | |
| 5,088,918 A | | 2/1992 | Schaale et al. | |
| 5,090,896 A | * | 2/1992 | Kenner et al. | 431/262 |
| 5,110,286 A | * | 5/1992 | Gaysert et al. | 431/208 |
| 5,253,806 A | * | 10/1993 | Gaysert et al. | 237/12.3 C |
| 5,707,227 A | | 1/1998 | Langen et al. | |
| 5,722,588 A | * | 3/1998 | Inoue et al. | 237/12.3 C |
| 5,927,269 A | * | 7/1999 | Quarrie | 431/168 |
| 6,213,406 B1 | | 4/2001 | Kenzi et al. | |
| 6,427,924 B2 | * | 8/2002 | Takagi et al. | 237/12.3 C |

FOREIGN PATENT DOCUMENTS

| | | | |
|---|---|---|---|
| DE | 32 33 319 A1 | 9/1982 | F23D/5/12 |
| DE | 32 43 395 A1 | 11/1982 | F23D/11/44 |
| DE | 34 03 972 A1 | 2/1984 | F23D/5/00 |
| DE | 40 03 090 C1 | 2/1990 | F23D/11/44 |
| DE | 43 28 789 C2 | 8/1993 | F23D/11/44 |
| DE | 101 20 027 A1 | 4/2001 | B60H/1/22 |
| DE | 101 30 638 A1 | 1/2003 | F23D/5/18 |
| EP | 0 922 594 A2 | 6/1999 | B60H/1/22 |
| JP | 63017305 | 1/1988 | F23D/3/40 |

OTHER PUBLICATIONS

Patent Abstract of Japan, Publication No. 63017305, Publication date Jan. 25, 1988, Int. Cl. F23D 3/10. European Patent Office Search Report EP 02 01 4269 dated Apr. 9, 20033.

German Search Report dated Jun. 26, 2002 for corresponding German Applications.

Patent Abstracts of Japan, Publication No. 63017305A, Application No. 61160802, filed Oct. 7, 1986 by Applicant: Isuzu Motors Ltd., Inventor Kawamura Hideo, "Combustion Apparatus".

* cited by examiner

*Primary Examiner*—Derek Boles

(57) ABSTRACT

An evaporative burner includes an evaporative medium for feeding fuel vapor into a combustion chamber, a first heating device, having at least one ignition heating element projecting with at least its heating region into the combustion chamber for igniting fuel vapor present in the combustion chamber, and a second heating device, with at least one evaporating heating element associated with the evaporative medium for affecting its evaporation characteristic.

15 Claims, 9 Drawing Sheets

EVAPORATIVE BURNER

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates to an evaporative burner, for example, such as used for heating devices in motor vehicles.

TECHNICAL FIELD

Patent document WO 98/49494 discloses an evaporative burner, in which a porous evaporative medium, for example nonwoven material, is arranged in the floor region of a combustion chamber. Liquid fuel is conducted into this porous evaporative medium to be distributed in the evaporative medium by capillary action. The fuel evaporates on the side toward the combustion chamber, so that an ignitable or combustible mixture is formed on the side toward the combustion chamber by the accumulation of fuel vapor and combustion air in the region of the combustion chamber. A heating device is furthermore provided that includes a glow ignition pin projecting into the region of the combustion chamber. By heating the glow ignition pin, a high temperature is produced in its surroundings, such that the ignitable mixture in this region ignites and thereupon propagates into the region of the combustion chamber.

An evaporative burner is also known from German patent document DE 32 33 319 A1 in which a porous material is again provided in the floor region of a combustion chamber for the distribution and evaporation of fuel. A heating device constituted in the manner of a heating coil is provided on the side of the porous medium lying open toward the combustion chamber, and when current is applied can produce in the region of the porous medium the temperatures of about 1,100° C. required for combustion.

Such evaporative burners known from the prior art have the disadvantage that they require a comparatively long time to reach a high heating power, and the time is distinctly longer than that required, for example, by pressure pulverizers, air atomizer burners, or ultrasonic atomizer burners. A substantial reason for this is that energy for the evaporation of further fuel is also withdrawn from the flame arising from ignition, and prevents rapid flame propagation into the combustion chamber, particularly at low external temperatures and with large component masses with comparatively good thermal conduction. This disadvantage of evaporative burners that are basically of interest due to their cost-effective construction is of little effect when they are used as auxiliary (stationary) heaters, for example. Here, the spontaneous production of comparatively high temperatures is not a matter of prime importance. However, it is another matter when such a burner is used as a supplementary heater, which is effective particularly for the cold start of an engine at low environmental temperatures. In this case, it is required that a very high heating power of the supplementary heater can be provided in a very short time, in order above all to reduce the pollutant emission in the starting phase of a drive assembly heated in this manner.

SUMMARY OF THE INVENTION

The present invention has as its object to provide an evaporative burner in which the operating phase of high heating power can be attained more rapidly.

According to the present invention, in order to attain this object an evaporative burner is provided, having an evaporative medium for feeding fuel vapor into a combustion chamber, a first heating device having at least one ignition heating element projecting at least with its heating region into the combustion chamber, for igniting the fuel vapor present in the combustion chamber, and also a second heating device, comprising at least one evaporative heating element associated with the evaporative medium in order to affect on its evaporation characteristics.

The present invention eliminates the prior art disadvantage by providing respective separate heating devices, one for ignition and the other for evaporating the fuel supplied in liquid form. These can be respectively optimally matched to what is required as regards the temperatures that they produce and the heating power required therefor. The rate of evaporation is increased by preheating the fuel to be evaporated, the withdrawal of heat energy from the propagating flame nevertheless being prevented. Flame propagation in the starting phase of such an evaporative burner clearly takes place more quickly, so that full load operation is finally also clearly attained more rapidly than with the evaporative burners known from the prior art.

In order to not expose the evaporative heating element, used solely to preheat the fuel to be evaporated, to the comparatively high temperatures prevailing in the combustion chamber, the at least one evaporative heating element is arranged on a side of the evaporative medium remote from the combustion chamber. This can be achieved, for example, by providing the evaporative medium on an evaporative medium support, and by arranging at least one evaporative heating element between the evaporative medium and the evaporative medium support. A still further protection of the evaporative heating element from excessively high temperatures can be achieved in that the evaporative medium is provided on a evaporative medium support and that the at least one evaporative heating element is provided on a side of the evaporative medium support remote from the evaporative medium.

In the evaporative burner according to the invention, there is furthermore provided a fuel feed channel arrangement for introducing the liquid fuel into the evaporative medium. In order to achieve an approximately uniform combustion characteristic over the whole combustion chamber, the fuel feed channel arrangement is constructed so as to distribute the liquid fuel over the evaporative medium. This can be attained, for example, in that the fuel feed channel arrangement has at least one annular channel region and/or at least one radial channel region going out from a fuel feed duct substantially radially in the evaporative medium and/or in an evaporative medium support.

The evaporative burner according to the invention has, for providing the ignitable mixture in the combustion chamber, an air supply channel arrangement for supplying air to the combustion chamber for combustion with the fuel vapor. For this purpose it can for example be provided that the air supply channel arrangement has at least one air inlet opening in the wall bounding the combustion chamber and open toward the combustion chamber.

In order to also deliver the combustion air required for ignition, simultaneously with the fuel vapor coming from the evaporative medium, into that spatial region in which the ignition occurs, the air supply channel arrangement has at least one air inlet opening which is open to the evaporative medium. For this purpose it can further be provided that the air inlet opening has at least one air supply channel region passing through the evaporative medium.

Since the heat removal occurring in the region of an evaporative burner is an important parameter affecting rapid flame propagation, according to a further aspect of the invention a better thermal insulation, and thus a further acceleration of flame propagation, can be provided for in that the at least one evaporative heating element and the evaporative medium are provided on an evaporative medium support made of ceramic material.

The evaporative medium can comprise porous material that can be of multilayer construction in order to achieve as rapid as possible a dispersion of the liquid fuel in the evaporative medium itself and then for the evaporation of the distributed liquid fuel. A nonwoven material can be used here, for example.

A general problem that arises in the operation of evaporative burners is in the first place the required high variability of the burner power. For example, a ratio of maximum to minimum burner power of at least 4:1 is required. In the second place, evaporative burners of this kind are to be operated with many different fuels, or with fuels of different quality. For example, besides being able to use conventional diesel fuel, it is of course also required here to be able to use winter diesel or arctic diesel. Also of increasing importance are natural-based fuels such as biodiesel produced from rape oil, and also fatty acid methyl ester fuels obtained by the transesterification of oils. The consequence of the use of often even unspecified fuels, particularly in connection with the high variability of the burner power, is the danger of deposits arising during combustion in that region in which the combustion takes place, thus particularly in the region of the combustion chamber, or in that region in which the evaporation of the basically liquid fuel takes place. One reason for this, among others, is that the evaporation does not always take place under optimum conditions, such as, for example, optimum evaporation temperature and optimum oxygen supply. The formation of deposits, which in general can be regenerated, i.e., are combustible deposits, impairs the operating characteristic of such an evaporative burner, whereby the maximum operating lifetime can also be limited.

According to a further aspect of the present invention, an evaporative burner has a cleaning arrangement for the removal of deposits which are deposited in the region of the combustion chamber during operation.

The provision of the cleaning arrangement can ensure that deposits or contamination produced or precipitated in the region of the combustion chamber are removed again, so that the evaporative burner can again be operated with improved efficiency.

Since the deposits forming in combustion operation are, as above-mentioned, in general themselves combustible, according to a further aspect of the present invention the cleaning arrangement includes a heating arrangement by means of which a temperature in the region of, or above, a burning-off temperature of the deposits can be produced.

Since, as already previously stated, that region in which the evaporation takes place is above all critical as regards the precipitation of deposits, it is provided, according to a further aspect of the present invention, that the heating arrangement is constituted for the production of a temperature in the region of, or above, a burning-off temperature of the deposits, at least in the region of the evaporative medium.

Particularly when the evaporative medium is provided with its own heating device, according to a further aspect of the present invention, this heating device also forms the heating arrangement used for cleaning. According to whether a normal evaporative operation or a burning-off operation for cleaning is provided, this heating device can then be operated with different heating power, in order to produce correspondingly different temperatures, which are suitable for the different operating phases.

According to a further aspect, the present invention relates to a cleaning process for the cleaning of a heating burner, in particular of an evaporative burner as was previously described, in which process, by the activation of a heating arrangement, deposits on a wall surrounding a combustion chamber are heated to a temperature in the region of, or above, the burning-off temperature of the deposits, and are burned off.

It is then provided that the cleaning process is carried out when the heating burner is not in a state of heating operation. Since various system components cooperate in normal heating operation so that fuel and oxygen are introduced in a ratio suitable for combustion, this measure according to the invention can ensure that oxygen which would per se be required for the normal combustion of the injected or evaporated fuel is not used for the burning-off of the deposits by a burning-off taking place during a heating operation phase, and thus becomes no longer available for combustion. An impairment of the normal operation can thus be avoided.

According to the present invention, the cleaning process is carried out following on a heating operation phase of the heating burner. The advantage of this measure is that the various system components are already heated, following on a normal heating operation state, so that the heating power necessary for burning off the contamination or deposits can be correspondingly reduced.

In order to ensure, even over a longer operating lifetime, that the operating characteristic of a heating burner is impaired as little possible by the formation of deposits, the process is carried out after a predetermined operating period of the heating burner. The time is monitored for which the heating device has been operated, possibly since the last cleaning. If a given maximum number of operating hours is reached here, the cleaning process according to the invention is carried out again.

In carrying out this cleaning process, the heating arrangement can then be driven with a mark/space ratio of less than unity. The advantage of this measure is that the heating power can be regulated in a simple manner by the cyclic driving of the heating device, without having to be dependent on the available supply voltage or being substantially limited by this.

In the operation of evaporative burners, it is important to know whether a metering pump device that introduces fuel into the combustion chamber is operating correctly, or whether fuel is present in the evaporative burner, in order to start or carry out the combustion in the correct manner. A method for this purpose is known, for example, from German patent document DE 198 59 319 A1, in which the excitation current of the metering pump is monitored, and based on the evaluation of this electrical current flowing through the metering pump, it is concluded whether or not the latter is operating correctly. However, it is difficult, for example, to also recognize defects which possibly do not reside in the metering pump itself, but only arise in the connecting region between the metering pump and the combustion chamber. Furthermore, this monitoring process is very expensive, because of the manufacturing tolerances in the manufacture of the metering pumps, and can be used only with comparatively low precision.

In order to decide with increased precision whether an evaporative burner is being correctly supplied with fuel, according to a further aspect of the present invention, the evaporative burner can have a control device by means of which the heating power at least of the second heating device can be adjusted, with the monitoring module monitoring the heating power and/or the required heating power of the second heating device and, based on the result of monitoring, detecting the presence of fuel evaporation.

The present invention makes use in this connection of the fact that the power of the heating device supporting the evaporation has to be increased in order to maintain the same temperature, when there is a transition from a state in which no evaporation is present to a state in which evaporation is present, because of the energy required for the evaporation of fuel and withdrawn from the surroundings. There would otherwise occur a cooling of that region in which the evaporation takes place. The present invention makes use of this change in the driving characteristic, or of the required driving characteristic, for this heating device in order to sense when the transition into the evaporation state occurs.

Furthermore, the evaporating heating element comprises an electrically operated heating element with an electrical resistance, which increases with temperature.

The present invention furthermore relates to a process for monitoring the fuel supply to an evaporative burner; this process can in particular be used in an evaporative burner according to the invention. This evaporative burner comprises a heating device provided for supporting the evaporation of fuel. In the process, it is determined, depending on the heating power of the heating device and/or on a change in the heating power of the heating device and/or on a required change in the heating power of the heating device, whether evaporation of fuel is present in a combustion chamber of the evaporative burner.

The procedure can, for example, be that the presence of the evaporation of fuel can be detected when there is a rise in heating power, and/or higher required heating power, during the operation of the heating device.

Since it is of considerable importance for the initial operation of an evaporative burner to detect when evaporated fuel is available, in order to then release further procedures, according to a further aspect of the invention for an ignition process of the evaporative burner, the heating device is operated in a first operating phase with higher heating power, in the region of a maximum heating power; in a subsequent, second operating phase, the heating device is operated with reduced, preferably heating power, and in a further subsequent, third operating phase, the heating device is operated with a heating power which is raised again and is increasing, the presence of fuel evaporation being detected at or after the transition into the third operating phase. When evaporation of fuel is detected, a heating device that supports the ignition of the evaporated fuel is activated.

If an evaporative burner is set out of action, which can occur by the deactivation of a heating device supporting the combustion and adjustment of the fuel supply, it is advantageous to ensure that fuel residues still present in the evaporative burner are completely ejected. This can for example take place in that a heating device supporting the evaporation is activated and the still present fuel is volatilized. Because of the above-described physical effect that energy is required for producing fuel evaporation, and is made available by the corresponding excitation of the associated heating device, according to the invention when the heating power, or required heating power, of the heating device supporting evaporation decreases, it is detected that further fuel is no longer available for evaporation. The reason for this is also again that when no further fuel is available, heat of evaporation no longer has to be made available, so that in order to maintain a predetermined temperature the heating power provided by the corresponding heating device can be reduced. This reduction of the heating power or of the required heating power can be made use of as a decision criterion.

BRIEF DESCRIPTION OF THE DRAWINGS

The present invention is described in detail herein below by means of preferred embodiments with reference to the accompanying drawings.

DETAILED DESCRIPTION OF THE INVENTION

Figure 1:
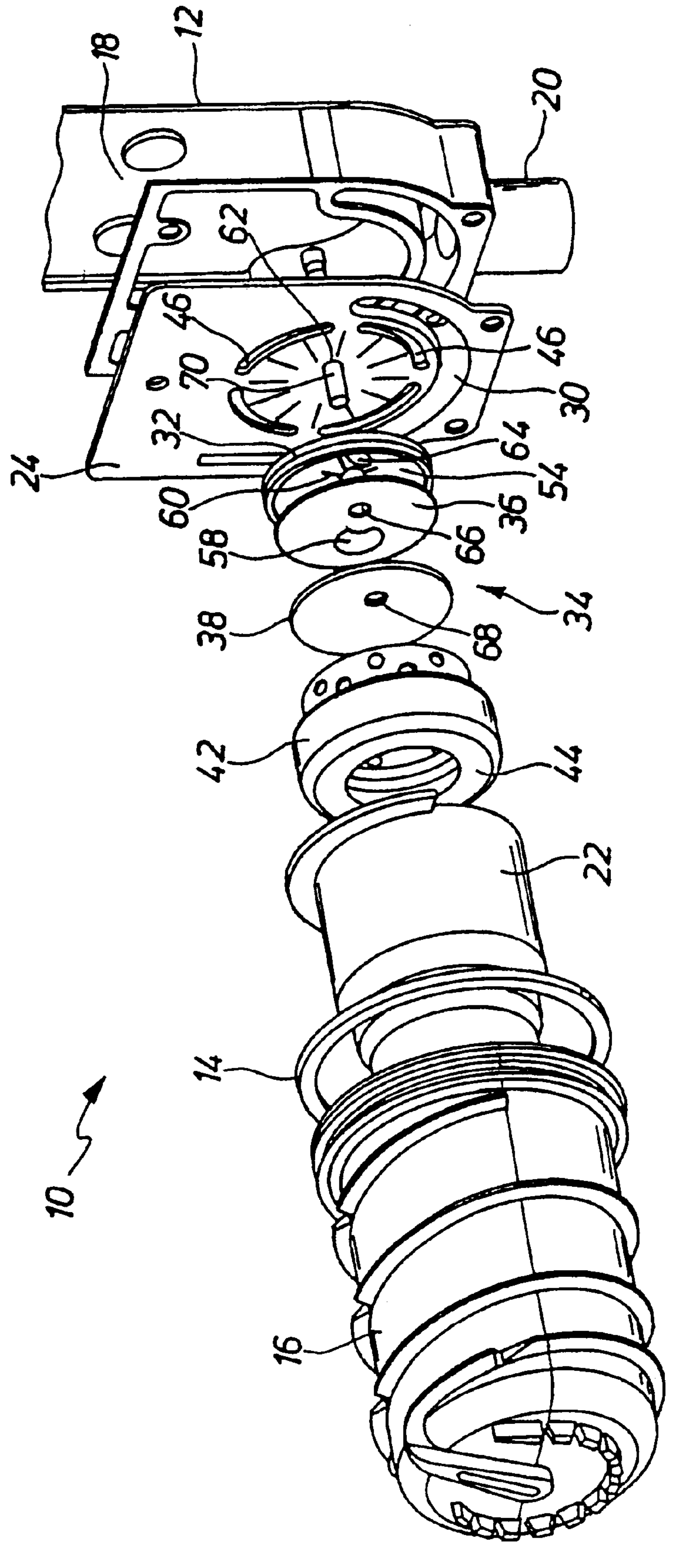
FIG. 1 shows an exploded view of the essential components of an evaporative burner according to a first embodiment of the present invention.
Figure 2:
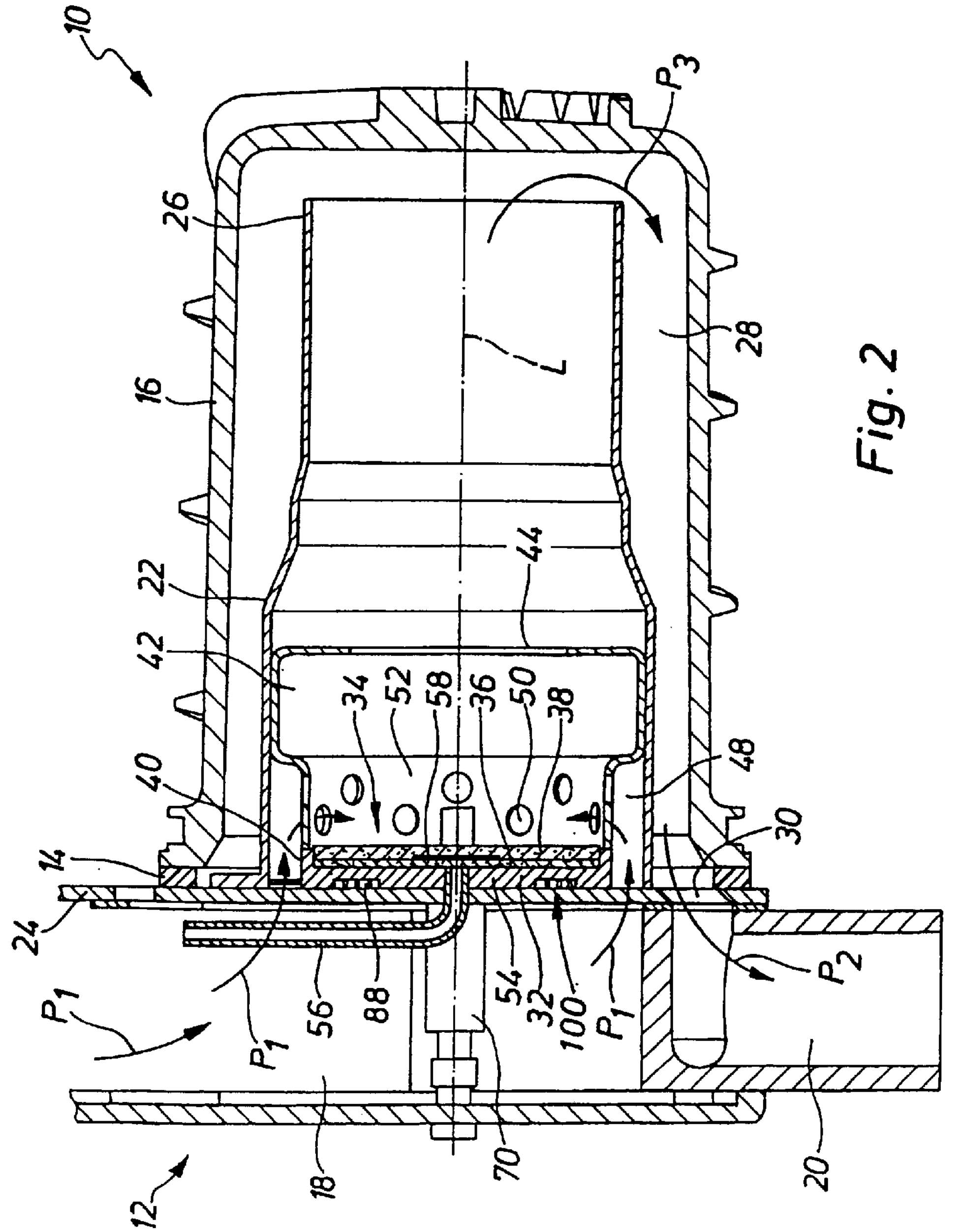
FIG. 2 shows a longitudinal sectional view of the evaporative burner shown in FIG. 1.

A first embodiment of an evaporative burner 10 according to the invention is shown in FIGS. 1–5. The evaporative burner 10 comprises air supply housing 12, shown only partially, and also a burner housing 16 mounted on this with the interposition of a sealing element 14 or the like and substantially defining a longitudinal mid-axis L of the evaporative burner 10. Combustion air is supplied, as schematically indicated in FIG. 2 by the arrow $P_1$, in an air supply region 18 of the air supply housing 12. The combustion exhaust gases are removed from the region of the evaporative burner 10, as indicated by an arrow $P_2$, via a removal region 20 of the air supply housing 12. Insofar as the combustion air supply or the removal of the combustion products is relevant for the present invention, further details thereof will be given hereinafter. It should otherwise be pointed out that the supply of combustion air or the removal of the exhaust gases arising from combustion can respectively take place in a conventional manner.

A flame tube 22 is provided in the burner housing 16, extending along the longitudinal mid-axis L of the evaporative burner 10. The flame tube 22 is secured, similarly to the burner housing 16 in its axially open region, to the air supply housing 12, namely to a forward housing plate 24 of the same. The flame tube 22 is axially open at its end region 26 remote from the housing plate 24, so that, as indicated by the arrow $P_3$, the exhaust gases resulting from the combustion can flow in an annular spatial region 28 formed between the flame tube 22 and the burner housing 16. The housing plate 24 has in its lower region an outlet opening 30 like a slotted hole that extends in a curve over an angular range of approximately 180°. The flame tube 22 is positioned on the housing plate 24 such that this outlet opening 30 is situated outside the spatial region enclosed by the flame tube 22 and thus produces a connection between the annular space 28 and the removal region 20 of the air supply housing 12.

An evaporative medium support 32, shaped like a pot, is mounted on the housing plate 24 on the same side as the flame tube 22, in the spatial region enclosed by the flame tube 22. The evaporative medium denoted generally by 34, and consisting of two layers 36, 38 of nonwoven material in the example shown, is arranged in the spatial region enclosed by the evaporative medium support 32. The nonwoven material layer 36 is, for example, constituted with a finer pore structure than the nonwoven material layer 38. An annularly shaped combustion chamber wall portion 42, for example of sheet metal, adjoins the substantially cylindrical wall region 40 of the evaporative medium support 32, and has in its end region situated remote from the evaporative medium support 32 an annularly constituted flame diaphragm 44 with a central passage opening.

It can be seen above all in FIG. 1 that several air inlet openings 46, constituted as curved, slotted holes, are provided on the housing plate 24. The air inlet openings 46 are situated —with respect to the longitudinal mid-axis L—in a radial region between the flame tube 22 and the evaporative medium support 32. As indicated by the arrows $P_1$ in FIG. 2, the combustion air can enter through these air inlet openings 46 into an annular space 48 that is formed between the flame tube 22 and both the evaporative medium support 32 and the region of the combustion chamber wall portion 42 adjoining the evaporative medium support 32. This annular space 48 is closed axially by the widened contour of the combustion chamber wall portion 42, which then abuts on the inner periphery of the flame tube 22. The combustion chamber wall portion 42 has, in its approximately cylindrical region adjoining the evaporative medium support 32, plural air passage openings 50 situated following each other in the peripheral direction and also, for example, offset axially. The air which reaches the annular space 48 via the air inlet openings 46 can thus flow in through these air passage openings 50 into the combustion chamber 52 enclosed by the combustion chamber wall portion 42 in a region situated near to the surface of the evaporative medium 34.

In a central region, i.e. near the longitudinal mid-axis 54, the floor region 54 of the evaporative medium support 32 has an opening into which a fuel supply duct 56 opens. The fuel supply duct 56 ends before the evaporative medium 34, i.e., before the nonwoven material layer 36 near the floor region 54. The fuel supplied by means of the fuel duct 56 thus enters the nonwoven material layer 36 in this central region. In order to achieve a uniform distribution over the whole radial region, firstly a disk-like deflecting element 58 can be provided between the two nonwoven material layers 36, 38, preventing the direct axial entry of the fuel from the nonwoven material layer 36 into the nonwoven material layer 38 in the region near the longitudinal mid-axis. A forced radially outward deflection is thereby attained here. In order to further favor this radially outward flow, groove-like channels 60 extending radially outward can be provided in the floor region 54 of the evaporative medium support 32, so that further radially outward flow paths are present here, bypassing the nonwoven material layer 36.

Openings 62, 64, 66, 68 are provided in the housing plate 24, the floor region 54 of the evaporative medium support 32, and the two nonwoven material layers 36, 38, at a radial distance from the longitudinal mid-line L. A glow ignition pin 70 passes through the said openings, so that its end region for providing the ignition temperatures projects into the combustion chamber 52.

An evaporating heating element 72, for example, comprising a heating wire, is provided in a recessed region 88 on the floor region 54 of the evaporative medium support 32, on the side remote from the evaporative medium 34. Both the glow ignition pin 70 and also the evaporating heating element 72 are of course supplied with electrical energy through corresponding contact leads, so that they can be heated by the passage of current.

The evaporative burner 10 described hereinabove as regards its construction with reference to FIGS. 1–3 thus has two heating devices that are constituted separately from one another and also can be operated independently of one another. A first of these comprises a glow ignition pin 70, while the second heating device comprises the evaporating heating element 72. In order to reach the maximum heating power as rapidly as possible with such an evaporative burner 10 according to the invention, i.e., to be able to achieve the state of complete combustion as rapidly as possible in the combustion chamber 52, the evaporative burner 10 can be operated, particularly in the starting phase, such that the evaporative medium support 32 and also the evaporative medium 34 supported on it can be heated by the passage of current through the evaporative heating element 72. Heating to a temperature in the region of 400° C. can then occur, so that a distinct rise of the evaporation rate of the fuel distributed by capillarity in the evaporative medium 34 can take place. By passing an electric current through the glow ignition pin 70, a temperature of about 1,100° C. can be set up in its surroundings, and is sufficient to ignite the mixture produced by fuel evaporation and combustion air supply in the region of the combustion chamber 52, in particular in the region near the evaporative medium 34. Since no heat for further fuel evaporation must be withdrawn from the flame that develops when ignition occurs, the heat required for this is substantially supplied from the evaporating heating element 72, and since by means of this an easily ignitable mixture is present by intensified vaporization of fuel, distributed over the whole region of the combustion chamber 52, a very rapid flame propagation occurs over the whole region of the combustion chamber. This however means that due to the very rapid development of the maximum combustion in the combustion chamber 52, the whole evaporative burner 10 is very rapidly brought into the operating state of maximum heating power.

It has been found that electrical powers in the evaporating heating element 72 of about 100 W are advantageous in order to achieve the temperatures of up to about 400° C. advantageous for evaporation. For ignition, an electrical power of about 60 W in the region of the glow ignition pin is advantageous in order to achieve the temperatures of 1,100° C. there.

The driving of the two heating devices, i.e., of the glow ignition pin 70 of the evaporative heating element 72 respectively, can take place in accordance with the respective operating state or external parameters. Thus in very low environmental temperatures, a higher heating power in the region of the evaporating heating element 72 can be required. If the evaporative burner 10 is to be operated in the auxiliary (stationary) heating mode, i.e., in a heating mode in which as rapid as possible a flame propagation is not absolutely necessary, the excitation of the evaporating heating element 72 can be completely dispensed with, contributing to a saving of electrical energy. Whether such an evaporative burner 10 is to be operated in the auxiliary or in the supplementary heating mode can be detected, for example, by the aid of various signals present in the control system of a vehicle, such as for example a signal supplied by the generator, and only supplied when the drive assembly, i.e., the internal combustion engine, runs.

A further aspect for achieving a rapid flame propagation is the thermal insulation of the components, which are heated up during combustion. It is therefore advantageous to make the evaporative medium support 32 shown in the embodiment according to FIGS. 1–3 of a material with good thermal insulating properties, such as e.g. ceramic material. Since, as can particularly be seen in FIGS. 2 and 3, the evaporative heating element 72 provided on the back side of the floor region 54 is arranged in a region 88 of reduced wall thickness of the floor region 54, a comparatively good heat transfer to the evaporative medium 34 is nevertheless achieved in this region. It is of course possible to also make the combustion chamber wall portion 42 of ceramic material, or to constitute this possibly integrally with the evaporative medium support 32. Alternatively, the combustion chamber wall portion 42 can be constructed, for example, as a lost-wax casting or as a sheet metal portion. For example, it is also possible to provide the evaporating heating element on the evaporative medium support 32 on that side on which this also supports the nonwoven material layer 36, i.e., the evaporative medium 34. A very good thermal contact is produced in this manner.

Figure 3:
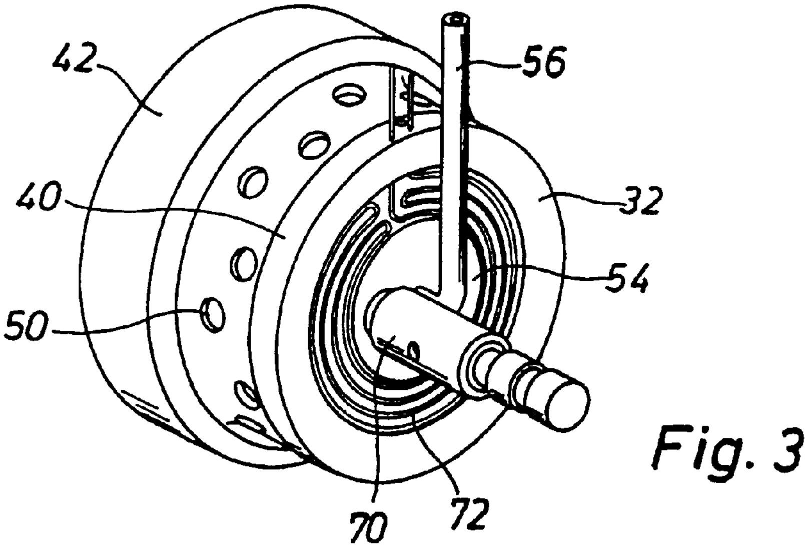
FIG. 3 shows an assembled view of the subassemblies, comprising the different heating devices, of the evaporative burner shown in FIG. 1.
Figure 4:
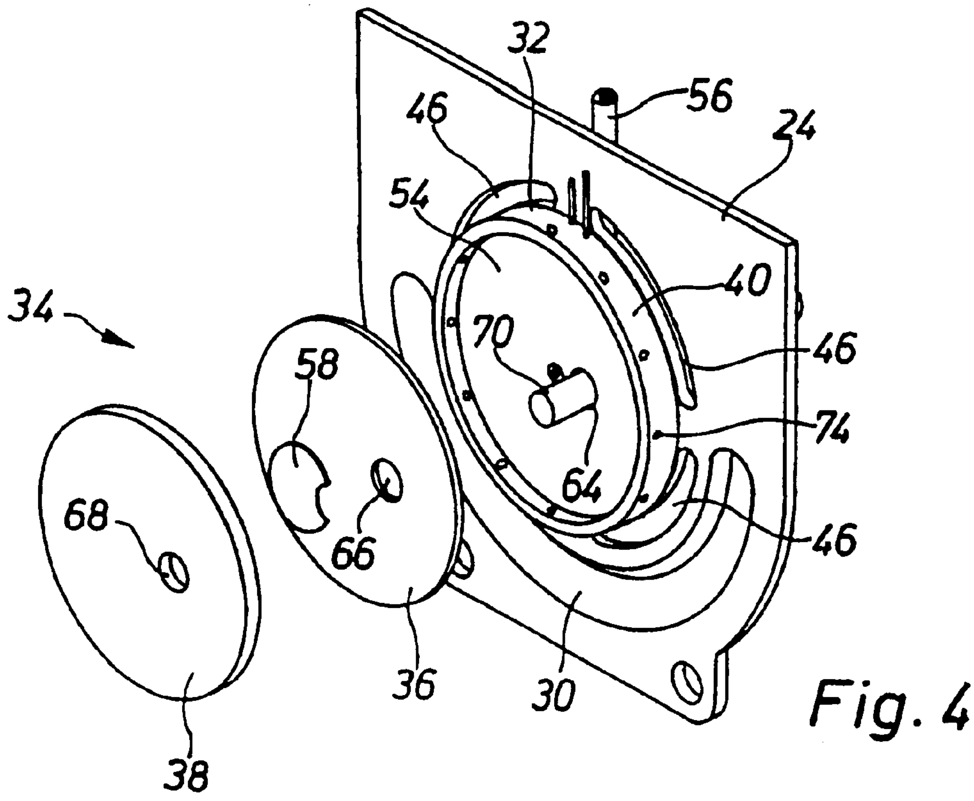
FIG. 4 is an exploded view of an alternative kind of embodiment of the subassembly, comprising the two heating devices, of the evaporative burner shown in FIG. 1.
Figure 5:
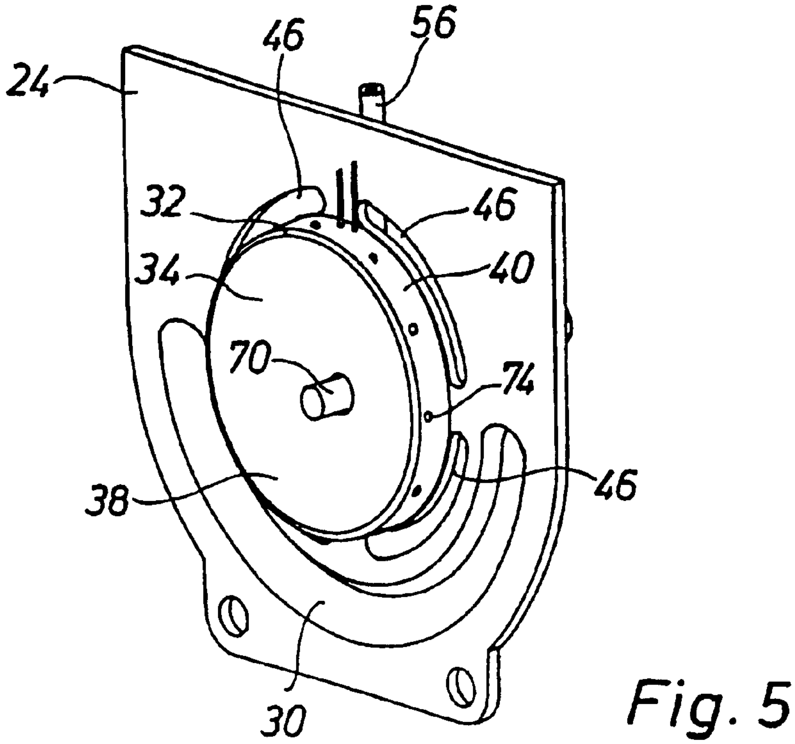
FIG. 5 shows the subassembly shown in FIG. 4, in the assembled state.

A modification of the embodiment shown in FIGS. 1–3, particularly in the region of the evaporative medium carrier 32, is shown in FIGS. 4 and 5. It can be seen here that several air passage openings 74, distributed in the peripheral direction, are provided in the wall region 40 of the evaporative medium carrier 32 constructed like a pot. These are accordingly situated in an axial region that is covered by the evaporative medium 34. The air passage openings 74 open in their radially inner regions into the evaporative medium 34. The combustion air supplied from the annular space 48 by means of the air passage openings 74 thus first flows through the evaporative medium 34, is heated there together with the fuel collected in the evaporative medium 34, and then enters the combustion chamber 52 from the evaporative medium 34 together with the vaporizing fuel. The production of an easily ignitable mixture of evaporated fuel and combustion air is therefore furthered, so that according to an advantageous variant the air passage openings 74 preferably serve to supply ignition air. The air then used or required in the normal combustion state is mainly supplied through the said air passage openings 50. Nevertheless it should be mentioned that with a corresponding dimensioning and number of the air passage openings 74, which feed air directly into the porous evaporative medium 34, the air passage openings 50 which do not open into the evaporative medium 34 but directly into the combustion chamber 52 can be dispensed with. Furthermore it should be mentioned that air passage openings, by means of which combustion air can be supplied which is preferably then used through improved mingling with the evaporated fuel in the ignition process, can of course also be present in the floor region 54 of the evaporative medium support 32. In order to achieve in this manner an intensified supply of combustion air into the combustion chamber 52, it can be considered that corresponding passage openings can also be provided in the evaporative medium 34 in alignment with the then to be provided passage openings in the floor region 54.

It should be mentioned that, independently of whether the combustion air supply takes place via the floor region 54 of the evaporative medium support 32, the wall region 40 of the evaporative medium support 32, and thus into the porous evaporative medium 34, or the air passage openings 50 in the combustion chamber wall portion 42, an effect on the air flow behavior, and thus also the combustion behavior, can be obtained by a corresponding shape, dimensions, number and distribution of the air passage openings provided. In particular, a division into ignition air on the one hand, thus for example air supplied through the evaporative medium 32 or very near to it, and combustion air, thus in general air conducted into the region of the combustion chamber 52, can be also achieved by corresponding configuration or arrangement and shape of the air passage openings arranged in different regions. In particular, the air flowing along the wall regions bounding the combustion chamber provides for cooling, this air being simultaneously preheated.

An alternative kind of embodiment of an evaporative burner according to the invention is shown in FIGS. 6–10. The basic structure of the evaporative burner 10 corresponds to the previously described structure as regards making available the air supply region 12 and also the evaporator housing 16. However, a clear difference consists in that an air supply tube 80 is now provided which is situated radially inward and is concentric to the flame tube 22. In an axially open end region in which an air swirling arrangement 82, for example constructed with spiral surfaces, can be provided, this air supply tube 80 receives combustion air supplied from outside as shown by the arrows $P_4$, and conducts this in the axial direction in a central region, and introduces the air via numerous air inlet slots 84 provided in the other end region, radially outward and possibly also in the axial direction, as shown by the arrow $P_5$ in FIG. 8, into the combustion chamber 52 substantially formed between this air supply tube 80 and the flame tube 22. The flame tube 22 thus forms a component, which bounds the combustion chamber 52 in the radially outward direction. As in the previously described embodiment, the combustion gases flow via the annular space 28 to the opening 30 in the housing plate and from there to the removal region 20, for example shown in FIG. 7 in which the flame tube is not shown. The evaporative medium support 32 is constituted as an annular segment, as can especially be seen in FIG. 6 and FIG. 10. The two nonwoven material layers 36, 38 of the evaporative medium 34 are also constituted in annular form and have the openings 66, 68 in the region in which the evaporative medium support 32 is interrupted. In the assembled state, the evaporative medium support 32 with the nonwoven material layers 36, 38 supported on it is arranged surrounding the air supply tube 80 in the floor region of the combustion chamber 52, so that the nonwoven material layer 38 is again open toward the combustion chamber 52.

The evaporative medium support 32 has a groove-like annular channel 86, open axially toward the nonwoven material layer 36, in the surface in contact with the nonwoven material layer 36. The fuel duct 56 opens into this annular channel 86, so that the fuel supplied via the fuel duct 56 can be distributed in the peripheral direction through the channel 86 over the whole annular nonwoven material layers 36, 38.

The evaporative medium support 32 has, on the axial side remote from the nonwoven material layer 36, a further recess 88 in which is positioned an evaporating heating element 72 formed by a heating coil or including such a heating coil.

The glow ignition pin 70 is supported in an insertion region 90 formed for it on the housing plate 24 so that its region provided for producing a high temperature passes through the interrupted region of the evaporative medium support 32 and also the openings 66, 68 in the nonwoven material layers 36, 38, and in fact, in the example shown, in a skew configuration with respect to the longitudinal mid-line L. The free end region of the glow ignition pin 70 is thus positioned close to that region which a comparatively large amount of fuel reaches by evaporation in the combustion chamber 52 when current is passed through the evaporative heating element 72.

The advantages mentioned hereinabove may also be attained with this embodiment by suitable cooperation of the two heating devices.

Figure 9:
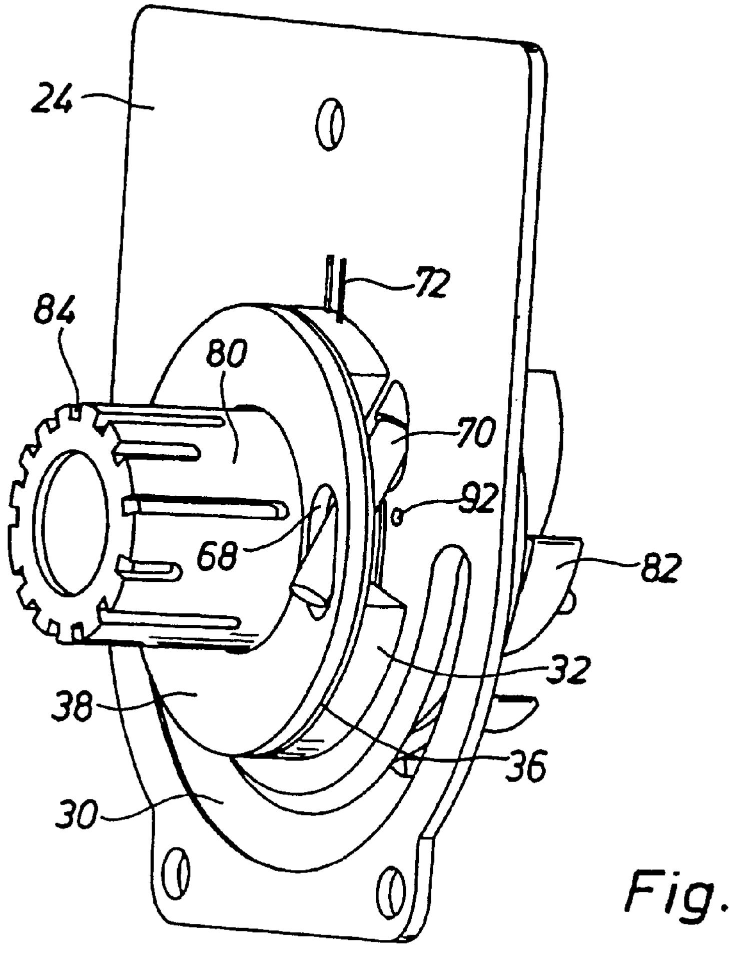
FIG. 9 shows the subassembly having the different heating devices of the evaporative burner of FIG. 6, in the assembled state.
Figure 6:
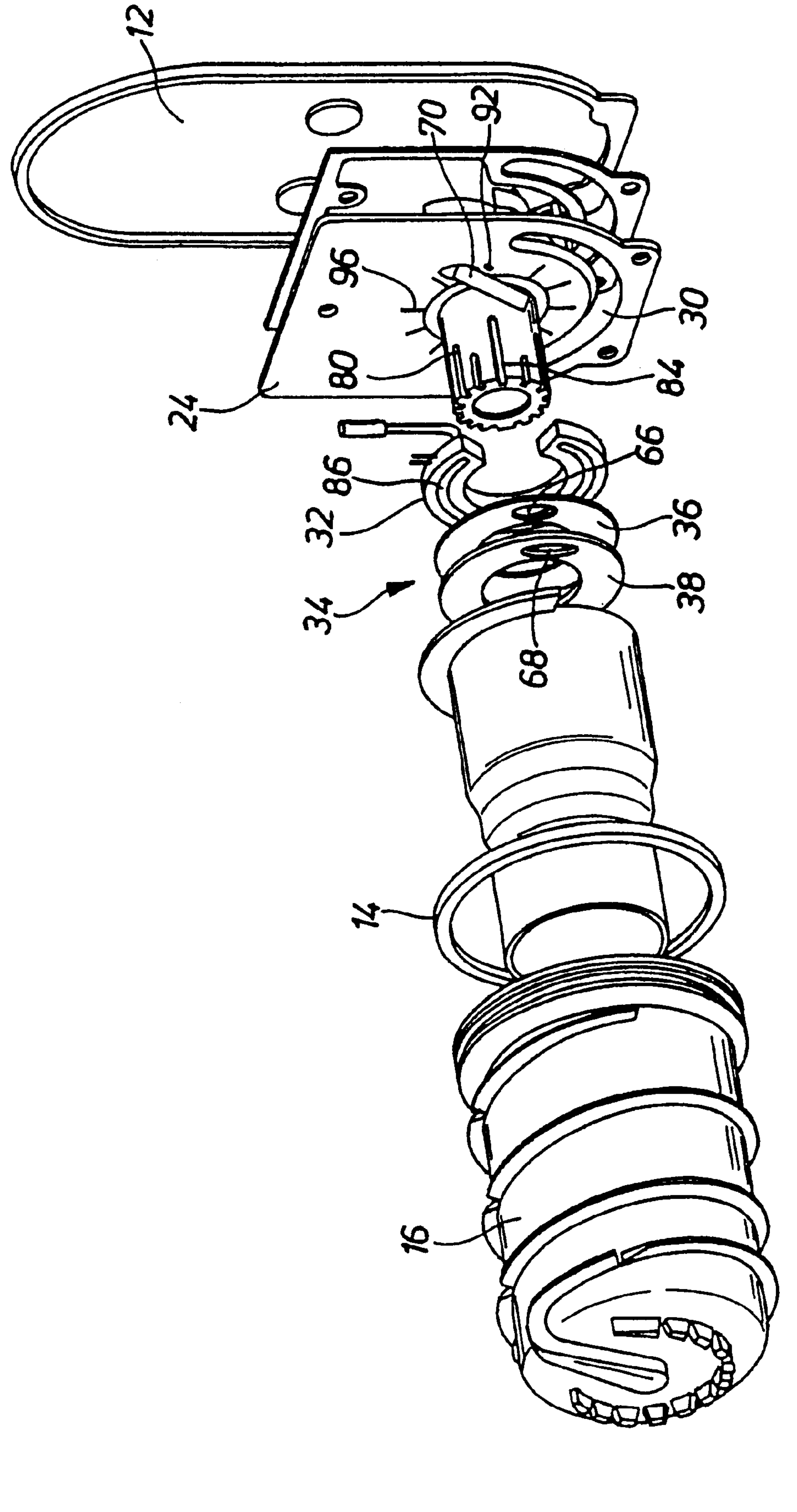
FIG. 6 shows an exploded view of the essential components of an evaporative burner according to an alternative kind of embodiment of the present invention.
Figure 7:
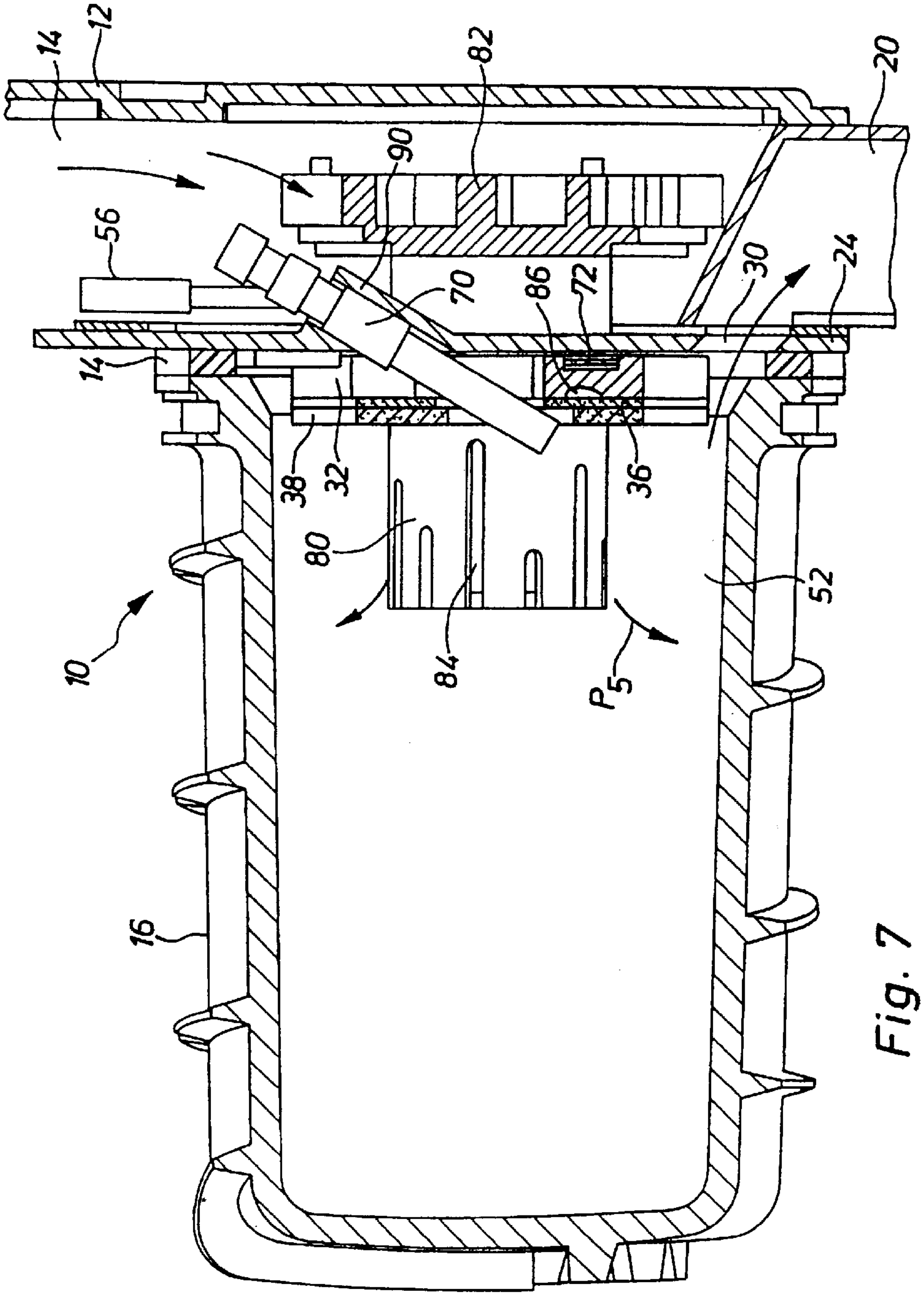
FIG. 7 shows a longitudinal section of the evaporative burner of FIG. 6, sectioned in a plane which does not contain a longitudinal mid-axis of the evaporative burner.
Figure 8:
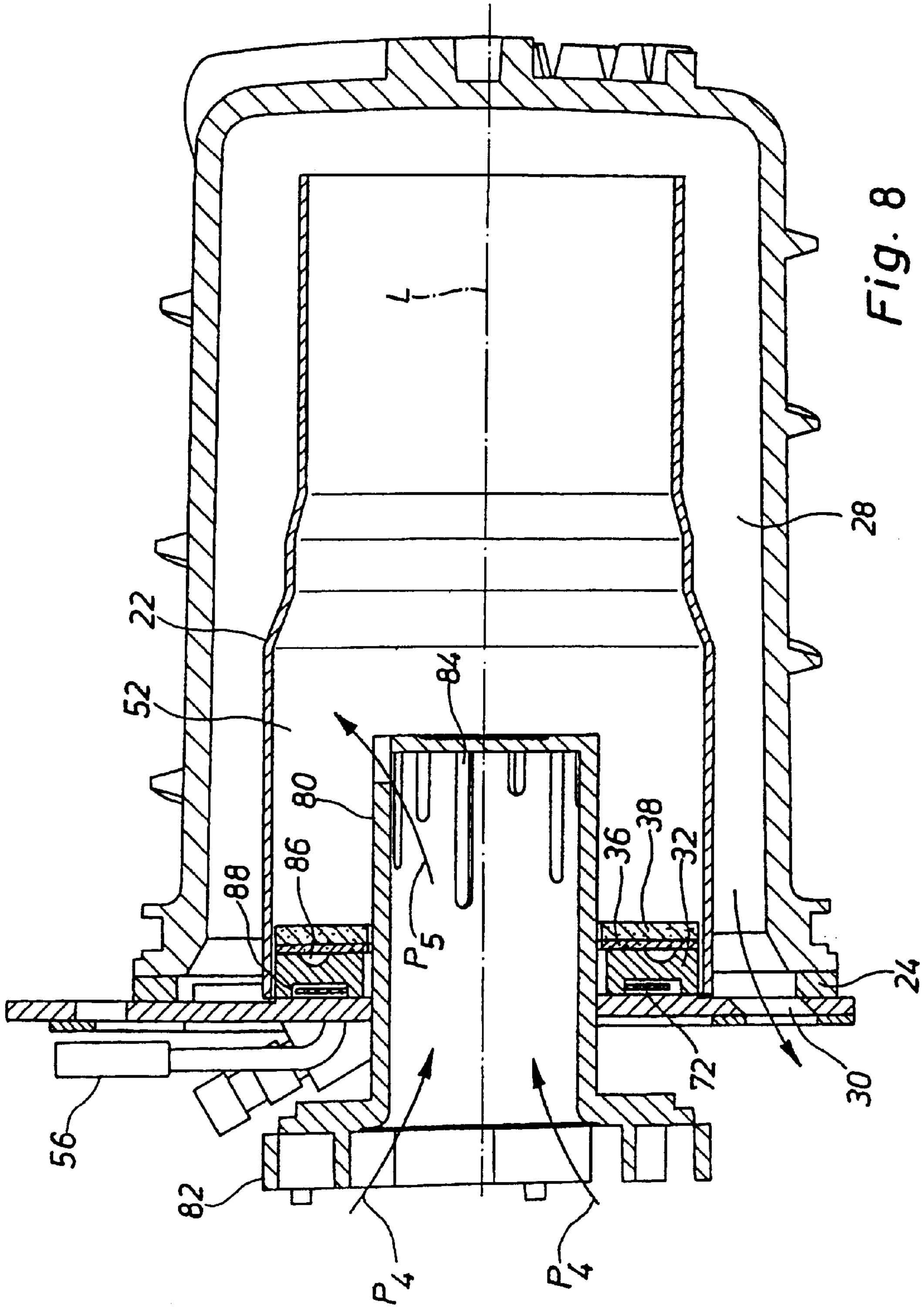
FIG. 8 shows a sectional view of the evaporative burner shown in FIG. 6, sectioned in a plane containing the longitudinal mid-axis.
Figure 10:
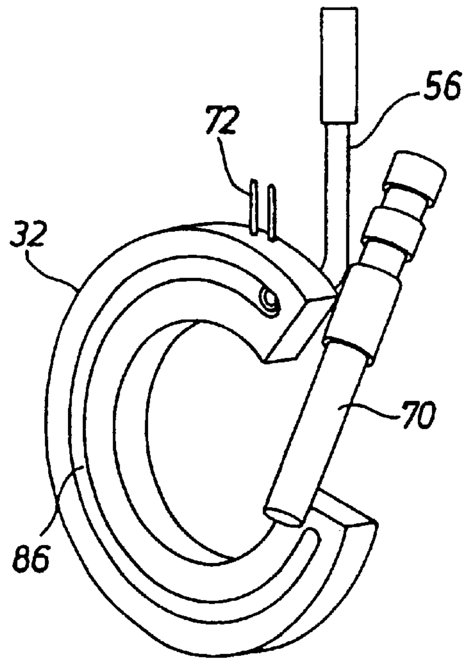
FIG. 10 shows the two heating devices used in the evaporative burner of FIG. 6.

In addition to the supply by means of the slots 84 of the air that provides for combustion, it is furthermore possible to deliver air then preferably used for ignition directly into the region of the glow ignition pin 70 by means of a passage opening, which can be seen in FIGS. 6 and 9, in the housing plate 24. This air supplied by means of the passage opening 92, via the recessed region of the evaporative medium support 32, can reach the openings 66, 68 of the nonwoven material layers 36, 38 and then via these openings into the combustion chamber 52 directly into that region in which the combustion occurs in the surroundings of the glow ignition pin 70.

Figure 11:
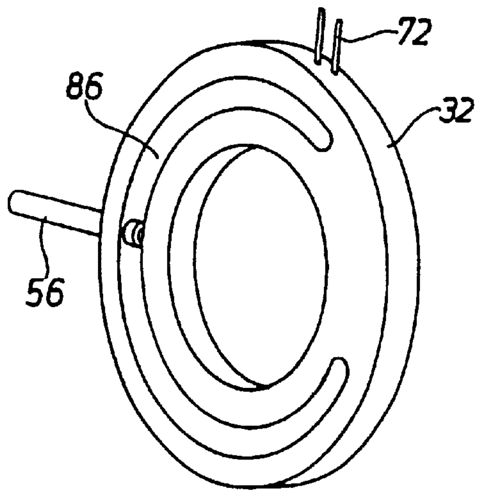
FIG. 11 shows an alternative kind of embodiment of the heating device used for evaporating the fuel and for distributing the same.

An alternative kind of fuel supply in this kind of embodiment is shown in FIG. 11. It can be seen here that the fuel is not fed via the fuel duct 56 in the axial direction into the channel 86, but is introduced approximately from radially outward into a peripheral middle region of this channel 86. Because of the introduction into the peripheral middle region of this channel 86, a still better distribution of the supplied fuel can be achieved. It should be mentioned here that an annular evaporative medium support 32, which is uninterrupted in the peripheral direction, is provided in FIG. 11. Here, as described hereinafter, suitable positioning of the glow ignition pin 70 can be provided for by another positioning of the glow ignition pin 70 or by the provision of a passage opening for this, not shown in FIG. 11, in the evaporative medium support 32.

Figure 12:
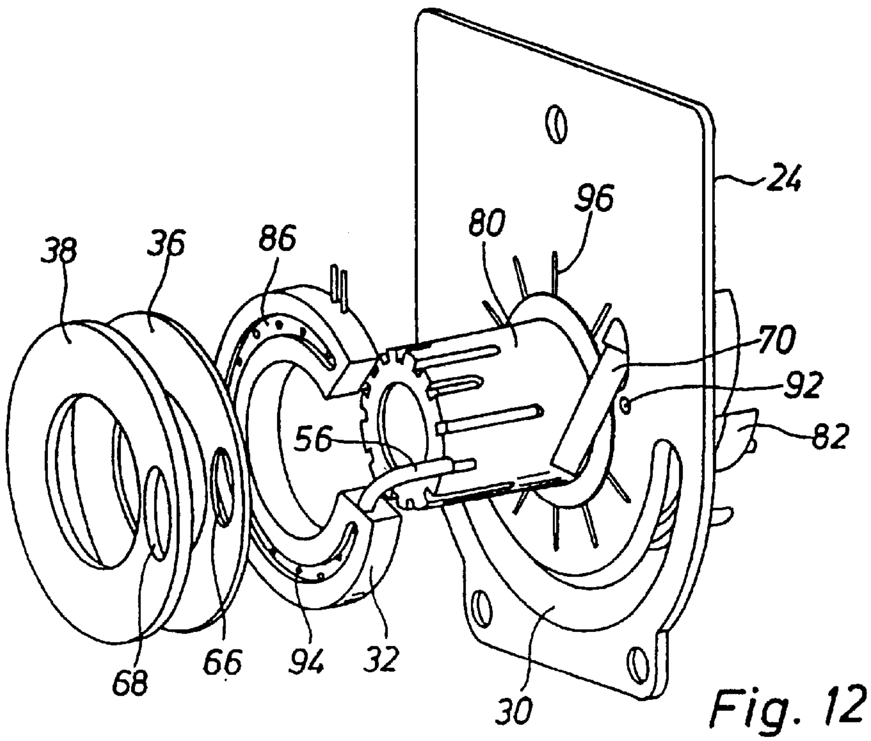
FIG. 12 shows an exploded view of the subassembly having the two heating devices of the evaporative burner of FIG. 6, according to an alternative kind of embodiment.

A further alternative variant of the fuel supply is shown in FIG. 12. It can be seen here that the fuel duct 56 extends into, or along, the groove-like open channel 86. The fuel duct 56 has, in the region situated in the channel 86, openings 84 through which the fuel can come out and enter the nonwoven material layer 36. The approximately annular distribution of the fuel shown in the variants according to FIGS. 6–12 is particularly advantageous with a pulsed fuel supply. An effect on the distribution characteristic can be obtained here by suitable selection of the dimension of the openings 94 or of their mutual spacing. For example, it is possible to provide the openings 94 distributed in the peripheral direction with varying dimensions or with varying mutual spacing.

Furthermore, it can be seen in FIG. 12 that spacer ribs 96 are provided on the housing plate 24 here, and reduce the contact surface between the evaporative medium support 32 and the housing plate 24 in order to minimize heat transfer. Also in this embodiment or in the previously described embodiments, the evaporative medium support 32 of annular constitution is preferably constituted of ceramic material or other poorly heat-conducting material.

Figure 13:
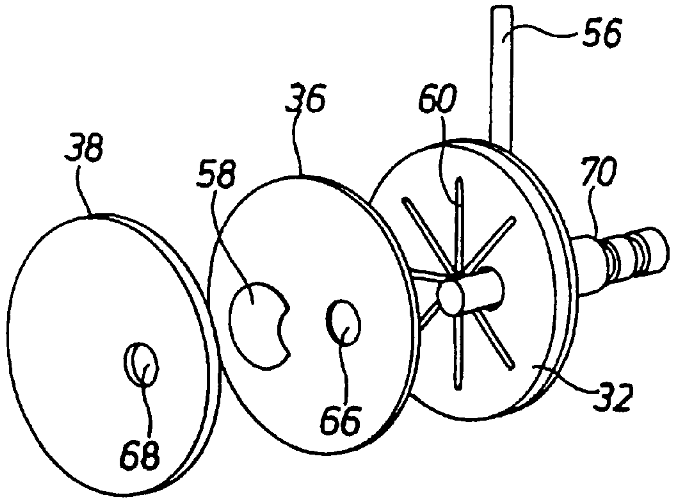
FIG. 13 shows an exploded view of a subassembly having the two heating devices and the evaporative medium according to an alternative kind of embodiment.
Figure 14:
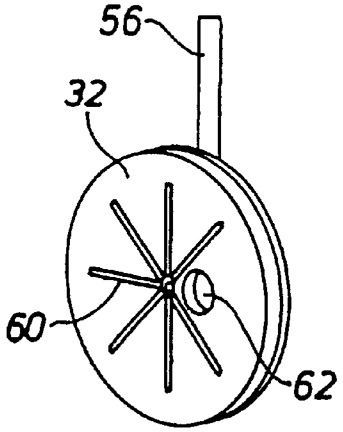
FIG. 14 shows the evaporative medium support provided in the kind of embodiment according to FIG. 13.
Figure 15:
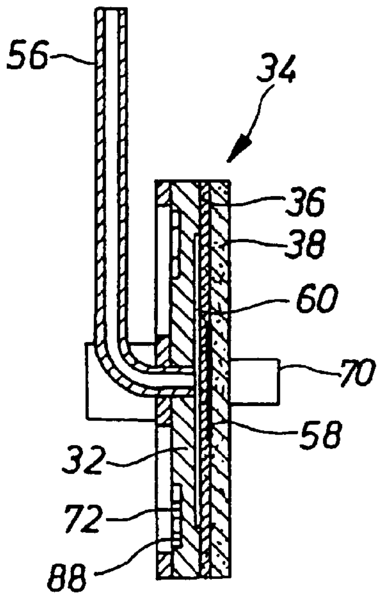
FIG. 15 shows a sectional view of the subassembly shown in FIGS. 13 and 14.

A further kind of embodiment of an assembly that includes the two heating devices or the evaporative medium is shown in FIGS. 13–15. The construction again approximately corresponds to the construction previously described with reference to FIGS. 1–5 with central fuel supply. An approximately disk-shaped evaporative medium support 32 can be seen here, into the central region of which the fuel duct 56 opens. On the side supporting the nonwoven material layer 36, the evaporative medium support 32 has groove-like channels 60 that extend radially outward in a star shape from the region into which the fuel duct 56 opens. The fuel supplied at the back side of the nonwoven material layer 36 is distributed, intensified by this, over the surface of the nonwoven material layer 36.

The embodiment variants shown in FIGS. 13–15 can form a preassembled assembly, and thus can include the evaporative medium support 32, the porous evaporative medium 34, for example, constituted in several layers, and also the two heating devices, i.e., the glow ignition pin 70 and the evaporative heating element 72. This assembly can then be integrated into the further manufacturing process of an evaporative burner according to the invention in a particularly simple manner.

Figure 16:
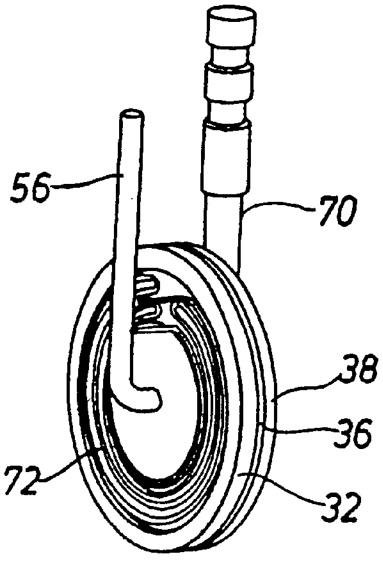
FIG. 16 shows a modification of the subassembly shown in FIGS. 13–15, in perspective back view.

A modification of such an assembly is shown in FIG. 16. It can be seen here that the glow ignition pin 70 is not integrated into this assembly, but projects radially outward—with respect to the longitudinal mid-line L—into the region of this assembly and thus into the region of the porous evaporative medium 34, and is positioned with its free end at a small spacing from this.

It is to be mentioned here that of course the different aspects shown previously in the various embodiments can be optionally combined together. Thus it is naturally possible that in all the embodiments air is fed into the combustion chamber by means of the region of the evaporative medium support 32 which supports the evaporative medium 34 through passage openings provided therein, and possibly also through passage openings provided in the porous evaporative medium 34, preferably in the surroundings of that region in which the end region of the glow ignition pin 70 is situated which can be heated for ignition. Moreover, it is possible in all the embodiments to supply the fuel either in the axial direction and distribute it for example through radial channels, or to supply it from radially outside and then to distribute it by means of annular and possibly in addition also radially extending channels. Furthermore, it is possible to combine the supply, shown in FIG. 1, of combustion air from radially outward via the combustion chamber wall portion 42 with the supply, shown in FIG. 6, of combustion air from radially inward via the air supply tube 80, i.e., to provide these two assemblies at the same time. All of these embodiments then make use of the essential teaching according to the invention, to provide a first heating device which is constituted, by its special kind of embodiment and by its heating power, so as to produce comparatively high temperatures for the ignition of the air/fuel mixture in a locally delimited region in the combustion chamber. A second heating device provides for a high evaporation rate of the fuel, by heating that medium that contributes both to the distribution and also to the evaporation of the fuel, so that a high evaporation rate of the fuel is present, independently of the flame formation, and favors a more rapid ignition and, in addition, results in an improved flame propagation over the whole combustion space. After the ignition process has taken place, and for example the heating device including the evaporative heating element has been switched off, and the glow ignition pin is then also no longer excited, a normal combustion is present in which the mixture of evaporated fuel and air introduced into the combustion chamber is combusted.

An evaporative burner was described hereinabove in which the evaporative heating element 72, particularly at the beginning of an operating phase, produces an intensified fuel evaporation and thus a more rapid provision of an easily ignitable and combustible mixture of fuel vapor and air. In general, a problem in such evaporative burners is that they are to be able to be used for very different fuels, and furthermore are to have a comparatively large burner power spectrum. Here a ratio of maximum to minimum burner power can be about 4:1. These two aspects have the result that combustion conditions are set which are often not ideal. The consequence of this is deposits, which arise more intensely in the region of the evaporative medium 34. The conditions there are often not those for optimum combustion, particularly as regards the temperature and the oxygen supply. According to the present invention, a corresponding embodiment of the evaporation heating element provides that deposits which are formed in combustion operation and which themselves are combustible are removed at given points in time. The procedure is to provide for the evaporation heating element a heating element that can produce temperatures that lead to the burning-off of the deposits. These are temperatures of at least 600° C. If such a high temperature is produced by a corresponding current through the evaporation heating element 72, a high temperature is produced such that the coke-like deposits are ignited and combusted. In order to support this, the fan which delivers combustion air into the combustion chamber 52 in normal combustion operation can likewise be set in operation. The oxygen required for burning-off the deposits can be provided in sufficient quantity in this manner.

So-called jacket heat conductors have been found to be suitable as heating elements usable for such purposes. These comprise a resistance wire embedded in ceramic powder. The ceramic powder and this resistance wire are pressed into a heat-resistant steel tube. The essential advantage of this arrangement is that it is not electrically conductive and there is thus no danger of short circuits even when so-called coke bridges are produced. Furthermore, it is very heat-resistant and can be optimally adapted to other components because of its good deformability.

The heating of the evaporation heating element 72 to such high temperatures that deposits also present in the region of the combustion chamber 52, particularly in the region of the evaporative medium 34, are burned off can be carried out, for example, by monitoring the total operating time of the evaporative burner 10. In this manner it can be provided that the whole is brought more or less periodically back to a state in which it can carry out a correct combustion operation. Since in normal operation the oxygen is required for the combustion of the evaporated fuel and therefore substantially no oxygen is available for the combustion of deposits, the preferred procedure according to the present invention is that burning-off of the deposits is effected at a time at which the evaporative burner 10 is not in the operating state in which evaporated fuel is combusted. Here the procedure is preferably that the burning-off of the deposits is carried out following on such an operating phase. The advantage is that in this state various components of the evaporative burner 10 are relatively hot. The electrical power required for carrying out the burning-off is thus somewhat reduced.

In order to be able to use the evaporating heating element 72 in a simple manner either for a normal evaporation operation or for burning off deposits, it is preferably used in a cyclic manner with a mark/space ratio different from unity. According as to whether lower temperatures are to be reached in evaporation operation, or higher temperatures are to be reached in the burning-off operation, the mark/space ratio can be adapted correspondingly. In this manner it is furthermore ensured that the operation of the evaporating heating element 72 is substantially independent of the supply voltage. Merely the setting of the heating intervals makes possible a simple adjustment of the heating power.

A further advantage of the carrying out of a cleaning process in this operating phase is that in general after switching off a supplementary heater or an auxiliary heater, the internal combustion engine of a vehicle and the cooling water supplied to it are at operating temperature, and also the load on the supply network is reduced. In general, the seat heating and the rear window and windshield heating are also no longer in operation in this operating phase.

With the procedure according to the invention for the cleaning of an evaporative burner, the lifetime of such a unit can be markedly increased. Trials have shown that even a doubling of the lifetime can be attained. It should be mentioned that of course the cleaning arrangement 100 in the example shown, formed substantially by the evaporating heating element 72 or including this, can also include a separate heating element especially suitable for carrying out cleaning processes. The evaporating heating element on the one hand, and this heating element provided especially for the cleaning operation on the other hand, can be respectively adapted to their operating requirements in an optimum manner.

In evaporative burners of the type described at the beginning, the metering pump by means of which the fuel is introduced into the combustion chamber 52 or delivered to the evaporative medium 34 in general has its operation monitored. For example, the coil current of the metering pump can be monitored and whether it is operating correctly or not can if necessary be concluded. If however a liquid leak is present in the region between the metering pump and the combustion chamber, this can be detected only conditionally from the course of the current signal of a metering pump coil. In particular, a very precise evaluation of the course of this current signal would require very expensive electronics. It is therefore provided according to the present invention to attain information as to whether or not fuel is introduced into the combustion chamber 52 with incorporation of the evaporating heating element. This is described hereinafter.

In the sensing of the fuel supply, the present invention makes use of a given temperature-resistance relationship of the evaporating heating element 72 provided in the floor region of the combustion chamber 52. This is provided as a so-called PTC element, according to the principles of the present invention. That is, the evaporating heating element 72 to be excited by a flow of current has an electrical resistance which increases with rising temperature and correspondingly decreases with falling temperature. If now such an evaporating heating element heats the evaporative medium 34 to a temperature suitable for evaporation, for example in the region of 400° C., the evaporating heating element 72 is then excited by means of a control device (not shown). A voltage is applied to the evaporating heating element 72 in a cycled manner, i.e., with a given mark/space ratio. For temperature sensing, information can for example be memorized in the control device which reproduces the relationship between the electrical resistance, and thus the electrical current flowing at a given voltage, and the temperature in the region of the evaporating heating element 72. If it is determined that the current flow approaches a current flow to be expected for the desired temperature, the heating power can be gradually reduced by shortening the interval during which voltage is applied, i.e., the mark/space ratio is also reduced. On reaching the desired temperature, and thus on reaching a current associated with this temperature, the evaporating heating element 72 can be operated with a power which substantially serves to just keep the temperature constant.

If then fuel is conducted into the combustion chamber 52 or the evaporative medium 34 by excitation of a metering pump, and the fuel is evaporated due to the comparatively high temperature now prevailing there, energy is required for this. This energy is withdrawn from the surroundings in the form of heat energy. With the heating power at first still kept constant, a cooling thus takes place in the region of the evaporative medium 34 and then also in the region of the evaporating heating element 72. This cooling becomes evident in a correspondingly falling electrical resistance and hence, with a constant voltage, a rise of the current. The control device then seeks to keep the required evaporation temperature constant by increasing the heating power, i.e., lengthening the voltage pulse duration again, to make available a correspondingly raised heating power.

It can thus be seen that on beginning evaporation with the heating power at first kept constant, a change will occur in the current flowing in the evaporating heating element 72. This change, or regulating or control measures originating from this change, can be used as an indication that evaporation has begun. A signal indicating the beginning of evaporation can then be produced, for example, in the control device. The ignition process can thereupon be released, for example, by excitation of the glow ignition pin 70.

If such an evaporative burner is for example stopped, for example when the provision of additional heat is no longer necessary in a motor vehicle, the process is similarly carried out in order to reduce switching-off emissions. After to the basic switching-off of the evaporative burner 10, for example by switching off the metering pump, the evaporating heating element 72 is first excited again. The fuel still present in the evaporative medium 34 or in the supply duct provided therefor is further evaporated, so that with the heating power at first kept constant it is ensured that liquid fuel substantially no longer remains in the evaporative burner 10 itself. If all of the fuel is then evaporated, no additional heat energy is required to convert further fuel into the vapor phase. This thus means that with the heating power at first not actively changed, the electrical resistance increases due to the rise in temperature, and the current flowing through the evaporating heating element 72 decreases. The control device senses this. It can now be sensed, based on the sensed decrease of the electrical current, that no more fuel is present to be evaporated, so that the current flow through the evaporating heating element 72 can now also be set. For example, the procedure can be that the change of the electrical current is observed. If change is no longer present, it can be concluded that fuel is no longer available, and therefore the thermal conditions have no longer changed. It is furthermore possible that the control device seeks in a control process to set the heating power so that the temperature is kept constant. Only when no change of the heating power is required, the operation of the evaporating heating element 72 can then be begun, since this is an indication that also no fuel residues remain to be evaporated.

The procedure according to the invention in which, by the use of the electrical characteristic of the evaporating heating element, it can be sensed in a simple manner whether the supply of fuel is taking place, i.e., whether fuel is evaporated or not, different operating parameters can be matched to each other, without additional constructional measures and the costs entailed thereby being required. Besides the electrical monitoring, which is anyway possible, of the operational capability of a fuel supply system, such as a metering pump, for example, hydraulic monitoring can also take place, and with a correspondingly precise evaluation by means of the amount of heat required during fuel evaporation it can be concluded which amount of fuel has been introduced or evaporated.

We claim:

1. An evaporative burner, comprising:

a combustion chamber, an evaporative medium (34) for feeding fuel vapor into the combustion chamber (52), a first heating device (70) with a heating region, including at least one ignition heating element (70) for ignition of fuel vapor present in the combustion chamber (52), the first heating device projecting with at least its heating region into the combustion chamber (52), and a second heating device (72), including at least one evaporating heating element (72) associated with the evaporative medium (34) for affecting its evaporation characteristic, the at least one evaporating heating element (72) being arranged on a side of the evaporative medium (34) remote from the combustion chamber (52), further comprising an evaporative medium support (32), wherein the evaporative medium (34) is provided on the evaporative medium support (32) on a side thereof facing towards the combustion chamber (52) and the at least one evaporating heating element (72) is provided on a side of the evaporative medium carrier (32) remote from the evaporative medium (34).

2. The evaporative burner according to claim 1, further comprising a fuel supply channel arrangement (60; 86, 56) for introduction of liquid fuel into the evaporative medium (34).

3. The evaporative burner according to claim 2, wherein the fuel supply channel arrangement (60; 86, 56) is of a design for distributing liquid fuel over the evaporative medium (34).

4. The evaporative burner according to claim 3, wherein the fuel supply channel arrangement (60; 86, 56) comprises at least one of the following:

at least one annular channel region (86), at least one channel region (60) extending substantially radially in the evaporative medium (34), an evaporative medium support (32) supporting a fuel supply duct (56).

5. The evaporative burner according to claim 1, further comprising an air supply channel arrangement for supplying air to be combusted with fuel vapor into the combustion chamber (52).

6. The evaporative burner according to claim 5, wherein the air supply channel arrangement comprises at least one air inlet opening (50; 84, 92) in a wall bounding the combustion chamber (52) and open toward the combustion chamber (52).

7. The evaporative burner according to claim 5, wherein the air supply channel arrangement comprises at least one air inlet opening (74) open toward the evaporative medium (34).

8. The evaporative burner according to claim 5, wherein the air supply channel arrangement comprises at least one air channel region (92, 66, 68) that passes through the evaporative medium (34).

9. The evaporative burner according to claim 1, further comprising an evaporative medium support (32) constructed of ceramic material on which the at least one evaporating heating element (72) and the evaporative medium (34) are provided.

10. The evaporative burner according to claim 1, wherein the evaporative medium (34) comprises porous material arranged in plural layers.

11. The evaporative burner according to claim 1, wherein the evaporative medium (34) comprises nonwoven material (36, 38).

12. The evaporative burner according to claim 1, further comprising a cleaning device (100) for removal of deposits that are deposited in a region of the combustion chamber (52) during combustion operation.

13. The evaporative burner according to claim 12, wherein the cleaning device (100) comprises a heating arrangement (72) that produces a temperature in the region of, or above, a burning-off temperature of the deposits.

14. The evaporative burner according to claim 13, wherein the heating arrangement (72) that produces a temperature in the region of, or above, a burning-off temperature of the deposits is at least in the region of the evaporative medium (34).

15. The evaporative burner according to claim 14, wherein the heating arrangement (72) includes the second heating device (72).

* * * * *